June 25, 1957     L. N. CHELLIS     2,796,634
REVERSE FORMING PROCESS FOR MAKING SHAPED ARTICLES
FROM PLASTIC SHEET MATERIAL
Filed Dec. 21, 1953     2 Sheets-Sheet 1

INVENTOR.
Leroy N. Chellis
BY
ATTORNEY

June 25, 1957 — L. N. CHELLIS — 2,796,634
REVERSE FORMING PROCESS FOR MAKING SHAPED ARTICLES
FROM PLASTIC SHEET MATERIAL Filed Dec. 21, 1953 — 2 Sheets-Sheet 2

INVENTOR.
Leroy N. Chellis
BY
ATTORNEY

United States Patent Office 2,796,634
Patented June 25, 1957

2,796,634

REVERSE FORMING PROCESS FOR MAKING SHAPED ARTICLES FROM PLASTIC SHEET MATERIAL

Leroy N. Chellis, Endwell, N. Y., assignor to International Business Machines Corporation, New York, N. Y., a corporation of New York Application December 21, 1953, Serial No. 399,562

7 Claims. (Cl. 18—56)

The present invention relates to a reverse forming process for making shaped articles from plastic sheet material, and more particularly to such a process for shaping plastic sheet material, reinforced or otherwise, to a substantially three dimensional, convex-concave shape, without undesirably affecting the character of the decorative embossed surface thereof, which in the final article is on the convex or outer surface of the article.

Shaped parts of this kind, preferably also having one or more laminations of a character to impart the necessary mechanical strength thereto, are useful for many purposes, such for example as panels for housing office machinery, parts for furniture, etc. The present invention is, however, not restricted to any one particular thing or field as to the use to which the final article is to be put.

It is relatively simple and is known in the art to provide an embossed decorative surface, for example, a pebbly pattern, to sheet plastic material, such as vinyl plastic (thermoplastic) materials, usually by passing such sheet material in a sufficiently soft condition to be moldable through suitable calender rolls. One of such calender rolls is given a shape complementary to the surface to be formed. This process of forming sheet plastic material having one embossed decorative surface is well known in the art, so that such material, resulting from this process, may be purchased on the open market at this time. It is also known that material of this kind, for example, some one or more of the thermoplastic vinyl resins, may be combined or laminated with a fibrous layer, such as a felted cotton layer, either by adhesively securing these layers together or by causing portions of the vinyl resin to penetrate into the fibrous layer to an extent sufficient to secure the layers together.

The present invention is not limited to handling vinyl type plastic materials alone, including polymerized vinyl chloride, vinyl acetate, vinylidine, and/or mixtures thereof. Furthermore, the invention is not limited to handling thermoplastic materials as distinguished from thermosetting materials. The embodiment of the invention hereinafter particularly disclosed employs a thermoplastic polyvinyl type resin adhesively secured throughout its area to a felted cotton fiber layer, while the opposite or exposed side of the vinyl layer resin is given an embossed decorative surface having a pebbly pattern.

In the shaping of material of this kind to a convex-concave shape, the press-forming operation tends to distort the surface pattern and/or to obliterate it particularly at the points or zones of greater curvature where the degree of stretching of the plastic material layer is the greatest. This is so even though great care is exercised in attempting to distribute the stretching forces as much as possible.

It has been found that in accordance with the present invention, if sheet material used as the starting material is placed between mold members, such as conventional die members in the reverse direction from that which is finally desired and the shaping proceeded with to some extent or even to substantially the complete desired extent as a preliminary operation, the distortion of the surface pattern is at least minimized and often is reduced to a negligible amount. If, thereafter, the partially formed blank is reversed as to its curvature or turned inside out, then subjected to a final pressing operation, in both instances using smooth-surfaced molds or dies and possibly using the same pair of complementary molds or dies, the optimum conditions are attained from the point of view of retention of the desired embossed surface pattern.

This process has been found to be definitely superior to processes in which the surface pattern is imparted to the final article by being formed in the final shaping mold for several reasons. In the event that the article to be shaped has not only a planiform central portion but also substantially parallel opposite side flange portions, it would be substantially impossible to remove such an article, if rigid, from a concave mold which had the surface shaped to give the desired embossed surface pattern, due to the interlocking of the mold and the finished article. It would, of course, be possible to form such a mold in two or more parts and then to release the finished article therefrom by relatively moving such parts. The objection to this procedure, however, is that at the juncture of any two parts of such a mold, it is practically impossible to prevent a visible line being formed on the final article. When the final article is to have a decorative embossed surface pattern which is to be optically uninterrupted by such a line or lines, it is practically impossible to use a multi-part mold. Furthermore, it has been found much cheaper first to use a shaped calender roll to give the desired embossed surface pattern and then to take such steps as are necessary to prevent the destruction of or serious damage to this pattern.

The present invention, therefore, provides a process of molding such a sheet material in at least two stages using smooth-surfaced mold members and wherein the first molding or press forming step is performed with the decorative embossed surface initially in contact with the convex mold member, so as to be on the concave side of the partly formed blank. It my be that the close and intimate contact between the embossed surface and the convex mold member holds the surface pattern against distortion. However, whether this theory be correct or not, the fact remains that the process of the present invention serves admirably to minimize distortion of the embossed surface pattern, so as to produce final articles wherein the pattern is substantially uniform over both the plane surface portions and around the curved surface portions of the article as finally formed.

The present application is related to a co-pending application of Reynolds and Kress, Ser. No. 399,561, filed December 21, 1953, for "Laminated Plastic Body and Process of Making It." The line of division between these two cases is based upon the fact that the present application relates to the reverse forming process outlined above; while the Reynolds et al. application relates to the forming of a laminated article in which the thermoplastic layer and the contiguous fibrous layer are together laminated with a reinforced thermosetting layer used for imparting mechanical strength to the final article. Inasmuch as both processes are preferably performed in the making of the final desired article, the following description is made complete as to both inventions. The appended claims, however, are limited to the invention of this application.

The process of the present invention is illustrated in its presently preferred form in the accompanying drawings, in which.

Figure 3:
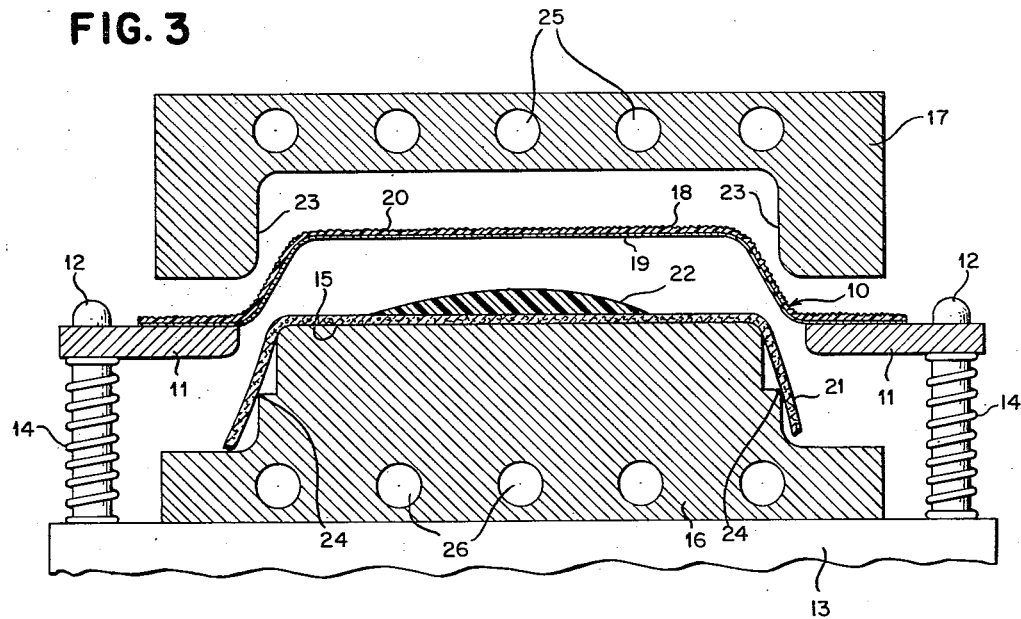
Figure 4:
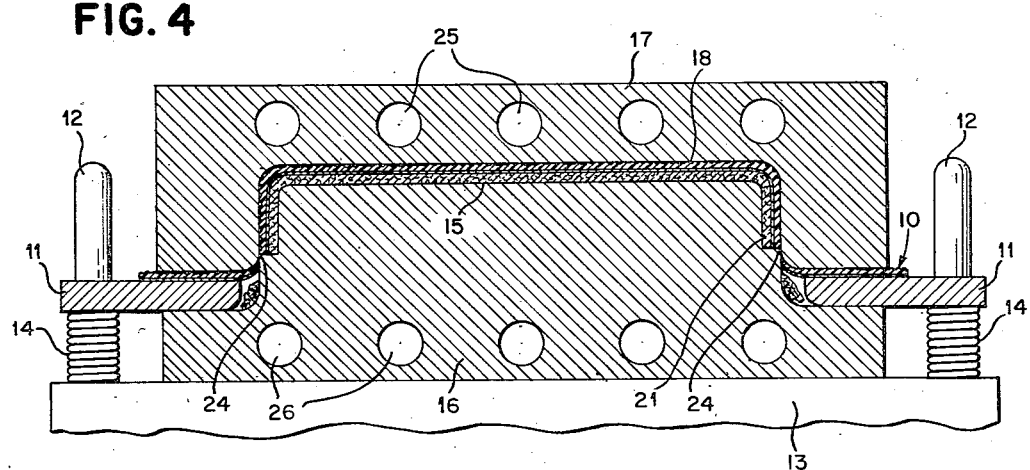

Fig. 3 is a similar view of the same mechanical parts with the vinyl-fibrous layer having its concavity reversed and with the principal reinforcing layer in position to be formed and the unformed, polyester material positioned thereon, the mold members being open; and Fig. 4 is a similar view with the mold members in their final molding position which they occupy during the curing of the thermosetting layer.

While the process of the present invention is adaptable for the forming of articles of many shapes, all preferably of concave-convex character, the present invention is peculiarly adapted for forming a molded laminated body of relatively thin sheet-like section having a form including a substantially planiform central portion and integral side flanges which are substantially perpendicular to the central portion and are disposed on at least two opposite sides thereof, and usually on two pairs of opposite sides, to provide a generally rectangular body, said central portion being connected to the side flanges by integral curved surface portions and the side flanges being connected to one another by similar curved surface portions. Such bodies may be used as panels for enclosing portions of machines, such as office machinery, although they are, of course, not limited to this specific use.

In accordance with the present invention, the desired outside surface layer or lamination which is on the convex side of the desired article, as finally formed, is preferably of a vinyl-plastic material.

By the term "vinyl plastic material" there is intended to be included all polymerized vinyl resins, including polymers and copolymers of vinyl chloride, vinyl acetate, polyvinyl acetals, polyvinylidene and copolymers including polyvinyls and polyvinylidenes. All these resins are thermoplastic in character and have the properties which are mentioned above in greater or less extent. Other polymerized resins having similar properties and which are generally considered in the art to be the equivalent of the vinyl resins above identified, may be considered the equivalent thereof for the purposes of the present application and are to be included generally as equivalents from the point of view of the present specification and appended claims.

As above set forth, the fibrous layer, which is first formed against or in some manner secured to the vinyl resin layer, may be either woven or unwoven fibrous material, including felted fibers, fibers of any desired character formed into threads or yarns, then woven, knitted or otherwise formed in a sheet-like fabric. The individual fibers may be either organic or inorganic in character, the only essential element from the point of view of the present invention being that the vinyl layer must be suitably secured to one surface or to one surface portion only of the fibrous layer, either by the use of a suitable adhesive, many of which are known in the art, or by causing portions of the vinyl plastic material to penetrate to some extent into, but not all the way through, the fibrous layer so as mechanically to hold the vinyl-fibrous layer together as an element for further fabrication as hereinafter set forth. A preferred form of the combined vinyl-fibrous layer is where the vinyl layer is secured by mechanical interlocking by partial penetrating into a felted cotton fiber layer, such combined vinyl-fibrous layers being available for purchase on the open market at this time.

The exposed surface of the vinyl layer is embossed to give a pebbly finish, in accordance with the present invention. The particular character of this finish and/or the design thereof is immaterial as long as the finish is one which may be properly described as "embossed," in that all portions thereof do not lie in a single plane, but rather it has portions at different depths when the vinyl layer, considered generally, is lying in a single plane. Such a surface finish may be imparted to the vinyl layer by calendering or pressing sheet vinyl material while this material is in a relative soft and formable or deformable state. This state may be reached by suitably warming or heating the vinyl material; and the surface may thereafter be retained by keeping the material substantially below such softening temperature.

One of the purposes of the present application as aforesaid, is to form the vinyl-fibrous layer to the desired shape without substantially or undesirably changing the surface characteristics of the embossed surface, so as at least to minimize the deforming or distortion of the embossed surface pattern of the vinyl layer. This is preferably effected by maintaining the vinyl layer at a temperature below its softening point, while at the same time preventing, as far as possible, mechanical distortion of the embossed surface by protecting this surface, as far as possible, during the forming thereof as hereinafter particularly described.

Figure 1:
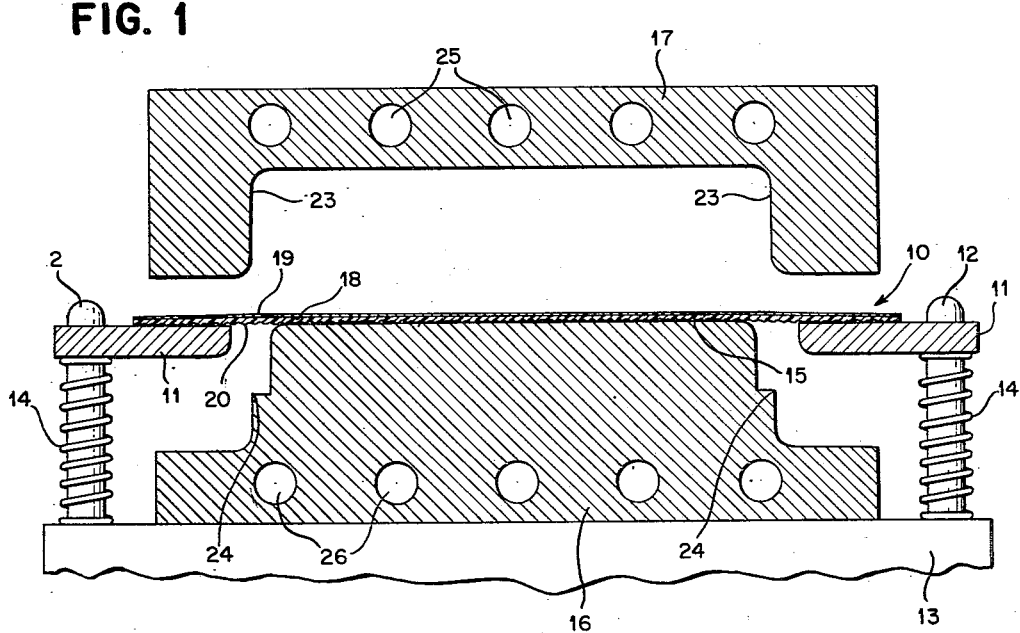
Figure 1 is a view of mold members, diagrammatic and in substantially central vertical section, showing the combined vinyl-fibrous layer in position for the start of the first forming operation, the mold members being separated and the vinyl-fibrous layer being supported in a single plane.
Figure 2:
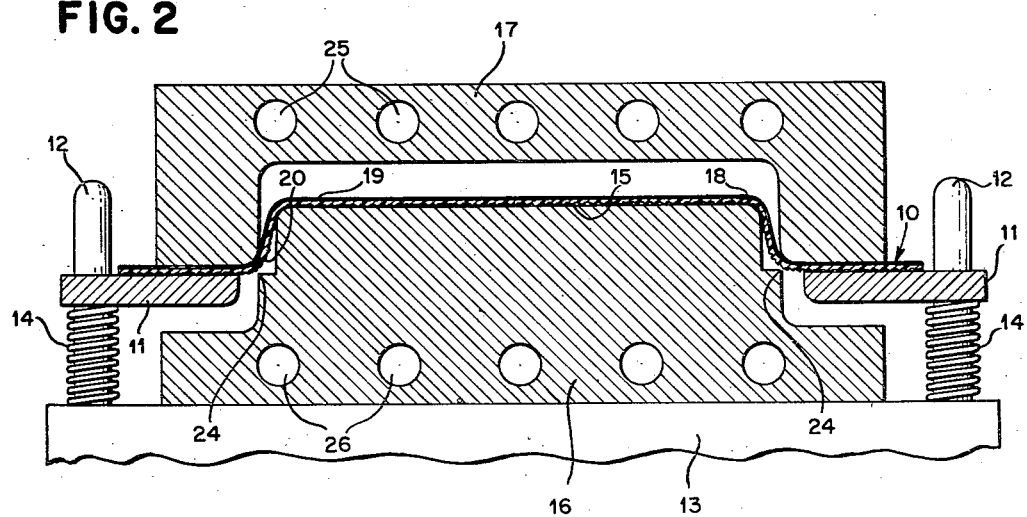
Fig. 2 is a similar view of the parts shown in Fig. 1 with the mold members partially moved together, illustrating a partial forming of the vinyl-fibrous layer with the vinyl layer on the concave side of the partial form.

Figs. 1 and 2 of the accompanying drawings illustrate the first step in the process of forming the combined vinyl-fibrous layer in a way so as to minimize the deforming or distortion of the embossed surface pattern of the vinyl layer. For this purpose the combined vinyl-fibrous layer indicated generally at 10 is placed with its edge portions on a supporting ring 11, which is guided for solely vertical movement by being sleeved upon a number of stationary, vertically extending pins 12. The pins 12 are suitably secured in a base member 13. Intermediate the base 13 and the underside of the ring 11 are disposed helical compression springs 14 surrounding each of the pins 12 respectively. At the upper position of the ring 11, the upper surface thereof is on substantially the same level as the central upper surface portion 15 of a lower mold member 16. Opposite the mold member 16 and substantially complementary therewith, is an upper mold member 17, the arrangement being essentially conventional in character.

The mold members 16 and 17 have smooth surface portions and are not shaped to form or to conform to the embossed surface on the vinyl layer. This embossed surface has previously been formed to a desired pattern by a preliminary treatment not illustrated in the accompanying drawings, and including, for example, such a conventional surface forming means as a shaped calender roll.

As shown in Fig. 1, the combined vinyl-fibrous layer 10 is positioned with the vinyl layer 18 lowermost and the fibrous layer 19 uppermost, so that the lower surface 20 of the vinyl layer 18 is the decorated or embossed surface. When the mold members 16 and 17 are relatively moved toward one another, as seen by a comparison of Figs. 1 and 2, the embossed surface 20 of the vinyl layer is forced against the lower mold; but due to its being against this mold and having substantially no relative movement with respect thereto, this surface is protected against distortion to a maximum extent, even though the movement together of the mold members 16 and 17 is effective to stretch the fibrous layer 19 and to reform the vinyl layer 18 to some extent, bringing these layers to the intermediate shape shown in Fig. 2, but with the embossed surface constituting the concave surface, as seen in that figure. During this period the peripheral portions of the combined layer 10 are clamped resiliently between the ring 11 and the peripheral portion of the upper mold member 17. This also tends toward minimizing distortion of the surface 20.

The partially formed layers shown in Fig. 2 may then be quickly and easily reversed or inverted to the position of the parts shown in Fig. 3, prior to the next forming step, this reversal or inversion of the concave-convex form of the partly formed article or layer shown in Fig. 2 being effected either manually or by some suitable automatic means, not shown. Once the partially formed layer has been reversed, as seen by a comparison of Figs. 2 and 3, this layer is in readiness for the final forming operation.

The strength-imparting thermosetting layer to be combined with the thermoplastic layer previously described, is preferably of a so-called reinforced polyester material. Such materials have now been used quite extensively and are available on the open market from a number of different commercial sources.

Essentially commercial polyester materials are blends of polyhydric alcohol esters of unsaturated acids and unsaturated, polymerizable liquid monomers. The more common of these resins have as the ester fraction the poly-functional, oxygen-convertible esters of dibasic acids such as fumaric, maleic, itaconic or citraconic acids and polyhydric alcohols such as ethylene glycol, propylene glycol, isobutylene glycol, glycerol, methyl glycerol or phthalyl alcohol; or the alcohol reactant may consist of polyhydroxy polymers of these alcohols such as diethylene, triethylene, or tetraethylene glycols or polyglycerol. The resulting esters include, for example, ethylene glycol maleate, ethylene glycol fumarate and ethylene glycol itaconate obtained by reacting ethylene glycol with the unsaturated acid. These esters are in turn blended with polymerizable liquids such as styrene, methyl methacrylate, vinyl acetate, cyclopentadiene, allyl maleate, allyl fumarate, divinyl benzene, etc.

While polyester materials of the type generally set forth are relatively easily cured, it is essential, in accordance with the present invention, that the curing be effected at a relatively low temperature. In order to secure this result and to cure the thermosetting resin, i. e., the polyester material, at a temperature lower than the softening point of the thermoplastic resin (vinyl resin), so as to prevent distortion of the desired embossed surface pattern thereof, it is necessary to add to the polyester resin an oxygen-liberating catalyst combination. Such a combination usually includes an oxygen-liberating material such as benzoyl peroxide and a promoter or accelerator tending to make the oxygen-liberating material or catalyst give up its oxygen to serve as a catalyst, such other material being, for example diethylaniline. Other combinations of oxygen-liberating catalysts and promoters or accelerators may be used in lieu of the benzoyl peroxide-diethylaniline combination. For example, other combinations contemplated for use, in accordance with the present invention, include (1) methyl ethyl ketone peroxide, plus cobalt naphthenate as a promoter, (2) cyclohexanone peroxide plus "Selectron 5901" as an accelerator plus "Selectron 5923" as a promoter ("Selectron" being a trade name of Pittsburgh Plate Glass Company), and (3) benzoyl peroxide plus promoter No. 607 (the latter is a product of Interchemical Corporation).

Specifically, a practical way of operation is to make two mixes separately, the first mix being, for example, polyester resin—100 parts, benzoyl peroxide—3 parts (both by weight); and the second mix being polyester resin—100 parts, diethylaniline—0.6 parts (both by weight). Then, immediately before the polyester resin is to be molded, as hereinafter set forth, the two mixes aforesaid may be mixed together. In this way premature curing of the polyester resin is effectively prevented, while relatively rapid curing at a relatively low temperature, less than the softening point of the vinyl resin, is practically assured. For example, with a mix of the composition set forth, the curing can be effected with the molds at a temperature in the range of about 130° to about 150° F. and in about two to five minutes, i. e., with the mold parts together for a total period of two to five minutes. The final formed article is then removed from the mold and cooled to room temperature.

It is recognized that the curing of polyester resins is an exothermic process, i. e., heat is generated and is given off during the curing operation. This heat will not all be dissipated at the time, but will result in a certain amount of increase in temperature of the article being molded over the 150° F., which is the maximum to which the molds are preferably heated. In general, the temperature of the molds, in accordance with the present invention, should be in the range of about 130–150° F., so that the final highest temperature attained by the body of material being molded will still be less than the softening temperature of the vinyl resin, so as largely to prevent and certainly to minimize the distortion of the embossed surface pattern of the vinyl resin.

As shown in Figs. 3 and 4, one or more layers of fibrous material, generally indicated at 21, is placed in forming position between the mold members 16 and 17. If desired, the layer or layers 21 may be preformed in some other operation in any suitable manner, as is well known to those skilled in the art. On the other hand, in most instances and where the side flanges to be formed are not too deep, it is satisfactory to start with the layers 21 in flat sheet form. The thermosetting resin, which in the case of polyester resins is combined with the oxygen-liberating catalyst as aforesaid, has a consistency of about that of thick cream, is then placed on the layer 21 substantially centrally thereof about as shown at 22. The mold parts 16 and 17 are then brought together as illustrated by a comparison of Figs. 3 and 4, resulting in forming the article to its final desired form and also, in the illustrated embodiment of the invention, in shearing the marginal portions from the desired central portion by coaction between the lateral side portions 23 of the mold member 17 with the shearing edges 24 of the mold member 16.

The mold members are held in the position shown in Fig. 4 for a predetermined time, for example, two to five minutes, during which the temperature of the mold members, coupled with the composition of the thermosetting resin, is effective to cure the thermosetting layer without unduly distorting the surface of the vinyl layer and thus to form the final article. It will be understood, of course, that the mold members 16 and 17 are installed in a conventional manner in a suitable press (not shown) permitting them to be moved relative to one another, as indicated diagrammatically in the accompanying drawings. Also, means are provided for controlling the temperature of the mold members. Such means are illustrated diagrammatically in the accompanying drawings as a plurality of cored holes 25 in the mold member 17 and 26 in the mold member 16. Suitable temperature controlling fluids may be caused to flow through these cored holes. Inasmuch as molding presses and mold temperature control means are both well known in the art, no further detailed showing of these means or description thereof is deemed necessary at this time.

Once the desired molded body has been completely formed, as shown in Fig. 4, it may be removed from the mold by separating the mold members in a conventional manner and by suitably stripping the molded body therefrom. Any desired and/or conventional means (not shown) may be employed for this purpose.

It has been found from many actual tests that when following the procedure set forth herein, the embossed outer surface of the vinyl layer will be prevented from distortion to a maximum extent; that the final article may be suitably molded, as set forth herein by the use of smooth surface molds from which the article may easily be stripped; and that the article as formed, will have an embossed surface which is substantially uniform, both on the central portion and around the curved surface portions, and which is optically uninterrupted by any seam, as would result from forming such a body in a multi-part mold at the juncture of any two parts of such a mold.

While there is herein shown and described a preferred embodiment of the present invention, both from the point of view of the composition of the several layers and from the point of view of the process by which the layers are laminated together, it is recognized that other and equivalent compositions and process steps will suggest themselves to those skilled in the art from the foregoing description. The present invention and the appended claims are intended, therefore, to include all such equivalents as fairly come within the scope thereof.

I claim:

1. The process of molding a plastic material sheet, which has an embossed decorative pattern on one surface thereof, to a convex-concave form to form a shaped article in which said embossed pattern is on the convex surface of the article as finally formed, and by using smooth-surfaced, substantially complementary, convex and concave mold members, while minimizing distortion of the embossed surface pattern on said sheet, which comprises the steps of first, at least partially press-forming said sheet between such mold members by initially placing the sheet of plastic material to be molded with its embossed surface in contact with said convex mold member and relatively moving said mold members to bring them a substantial distance at least toward each other, so as to form a shaped blank from said sheet in which the embossed surface is on the interior concave side of the blank, thereafter removing the shaped blank from between said mold members and completely reversing the curvature of said shaped blank to bring said embossed surface to a convex curvature, and then press-forming said blank to the final desired form of the shaped article to be made between complementary, smooth-surfaced mold members with the embossed surface forming the outer convex surface thereof.

2. The process of claim 1, wherein said plastic material sheet embodies a layer of fibrous material, and wherein the press-forming of said sheet, both as to the initial press-forming thereof and the subsequent press-forming of the blank to the final desired form of the shaped article are effective, not only to shape the plastic material, but also to shape said fibrous material layer.

3. The process of claim 1, for molding a composite laminated sheet including a plastic material sheet as aforesaid and further including a felted fibrous layer secured throughout its area to the surface of the plastic material sheet opposite that surface carrying the embossed pattern as aforesaid, and wherein the press-forming of said sheet, both as to the initial press-forming thereof and the subsequent press-forming of the blank to the final desired form of the shaped article, are effective, not only to shape the plastic material, but also to shape said fibrous layer.

4. The process of claim 1, for forming a shaped article from a composite sheet, including a vinyl plastic material layer adhesively secured to a felted cotton fiber layer, and wherein the press-forming of said sheet, both as to the initial press-forming thereof and the subsequent press-forming of the blank to the final desired form of the shaped article, are effective, not only to shape the plastic material, but also to shape said cotton fiber layer.

5. The process of claim 1, in which the same mold members are used first for initially forming the sheet plastic material to form a shaped blank and thereafter for press-forming the shaped blank to the final desired form of the shaped article, but during said press-forming of the shaped blank to the final desired form, the plastic material is reversed with respect to said mold members.

6. The process of claim 1, in which the same mold members are used in both the initial blank forming step and in the later article forming step, and wherein when said mold members are used in forming the plastic material sheet to form a shaped blank, they are brought only partly together, so that said shaped blank is intermediate in form between the plastic material sheet supplied to the process and the shape of the final desired article.

7. The process of claim 1, in which the plastic material sheet consists essentially of thermoplastic material, and in which at least the molds used in the process step of forming the shaped blank to the form of the final desired article are heated, so as to render the thermoplastic material somewhat more moldable than it is at room temperature.

References Cited in the file of this patent

UNITED STATES PATENTS

| | | |
|---|---|---|
| 1,904,718 | Cochrane | Apr. 18, 1933 |
| 2,075,286 | Jackes | Mar. 30, 1937 |
| 2,130,359 | Miller | Sept. 20, 1938 |
| 2,139,541 | Farnsworth | Dec. 6, 1938 |
| 2,441,961 | Gessler et al. | May 25, 1948 |
| 2,625,497 | Cadgene | Jan. 13, 1953 |